United States Patent [19]

Torino et al.

[11] E Patent Number: Re. 33,770

[45] Reissued Date of Patent: Dec. 17, 1991

[54] HEAT-FIXING APPARATUS

[75] Inventors: Mitsuhiro Torino, Fukaya; Keitaro Yamashita, Kamisato, both of Japan

[73] Assignee: Hitachi Metals, Ltd., Tokyo, Japan

[21] Appl. No.: 562,698

[22] Filed: Aug. 6, 1990

Related U.S. Patent Documents

Reissue of:

[64] Patent No.: 4,814,819
Issued: Mar. 21, 1989
Appl. No.: 105,538
Filed: Oct. 8, 1987

[30] Foreign Application Priority Data

Oct. 13, 1986 [JP] Japan ..... 61-242660
Apr. 24, 1987 [JP] Japan ..... 62-101676

[51] Int. Cl.[5] ..... G03G 15/20

[52] U.S. Cl. ..... 355/290; 219/469; 118/60; 432/60

[58] Field of Search ..... 355/282, 285, 290, 311; 219/216, 469; 118/60, 100; 432/60; 29/130, 132

[56] References Cited

U.S. PATENT DOCUMENTS 3,435,500 4/1969 Aser et al. ..... 29/130
3,904,354 9/1975 Moser ..... 219/469 X
4,219,327 8/1980 Idstein ..... 432/60
4,372,246 2/1983 Azar et al. ..... 118/60
4,430,406 2/1984 Newkirk et al. ..... 29/132 X
4,568,275 2/1986 Sakurai ..... 432/60
4,632,855 12/1986 Conlon et al. ..... 29/132 X

FOREIGN PATENT DOCUMENTS 0186314 7/1986 European Pat. Off. .
54-98226 7/1979 Japan .
59-45478 3/1984 Japan .
59-74578 7/1984 Japan .
59-217010 12/1984 Japan .
61-294475 12/1986 Japan .

*Primary Examiner*—Joan H. Pendegrass

[57] ABSTRACT

A heat-fixing apparatus comprising a heating roll to be brought into contact with a toner image borne on a sheet member, a pressure roll in pressed contact with the heating roll to provide a nip portion therebetween, each of the heating roll and the pressure roll being constituted by a cylindrical core coated with a heat-resistant, resilient layer and a resin surface layer having release properties, the heating roll and the pressure roll having such surface hardness as to make the nip portion substantially flat and also having substantially the same outer diameter, and the contact pressure of the rolls being such that the nip portion has a width within the range of providing good fixing capability. This heat-fixing apparatus can perform toner image fixing even on sheet members of a plurality of plies such as envelopes without creasing.

6 Claims, 2 Drawing Sheets

FIG. 1
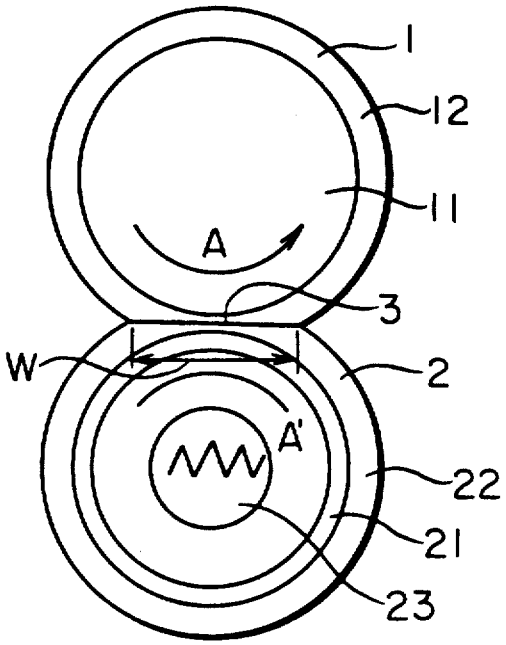
FIG. 2
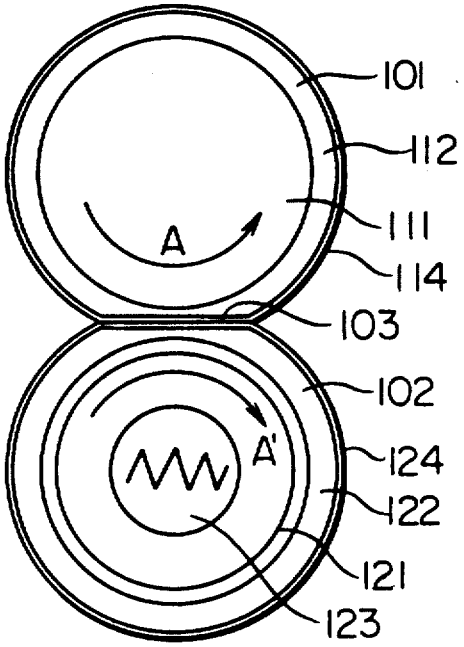
FIG. 3 *PRIOR ART*
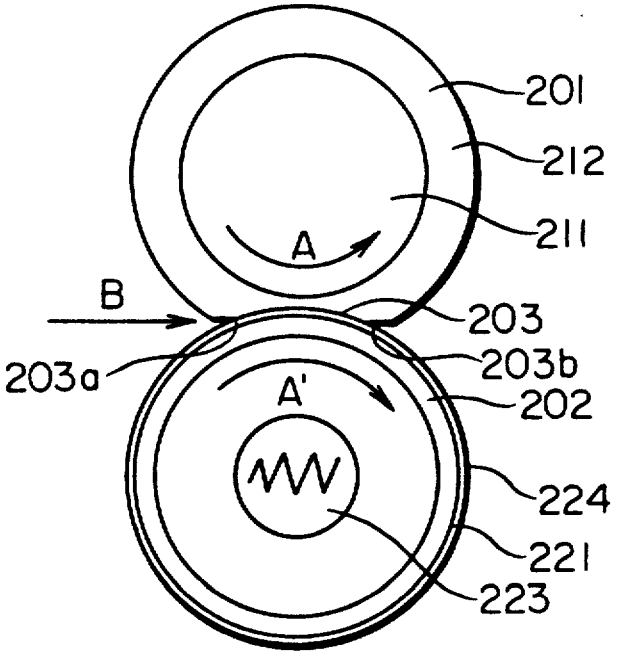

HEAT-FIXING APPARATUS

Matter enclosed in heavy brackets [ ] appears in the original patent but forms no part of this reissue specification; matter printed in italics indicates the additions made by reissue.

BACKGROUND OF THE INVENTION

The present invention relates to a heat-fixing apparatus adapted to be mounted in image-forming apparatuses such as electrophotographic apparatuses and electrostatic printing apparatuses for fixing a toner image formed on a paper or other sheet member between a pair of rolls rotating at some contact pressure, at least one of which is provided with a heating means, and more particularly to an improved heat-fixing apparatus capable of fixing a toner image even on a toner image-bearing sheet member consisting of a plurality of plies such as an envelope without suffering from wrinkling or creasing.

Conventionally known as a fixing apparatus for use in image-forming apparatuses is a heat-fixing apparatus of a heating roll type comprising a heating roll and a pressure roll arranged opposite to each other, the heating roll being constituted by a metal cylinder having good thermal conductivity coated with a non-adherent, heat-resistant layer and containing a heat source such as an infrared lamp, a halogen lamp or a nickel-chromium wire therein, and the pressure roll being constituted by a metal cylinder coated with a heat-resistant, resilient surface layer. In the above heat-fixing apparatus, the fixation of a toner image formed on a sheet is carried out by energizing a heat source to heat the surface of the heating roll to temperatures necessary for fixing of the toner, rotating the heating roll and the pressure roll at a proper contact pressure, and passing the sheet bearing the toner image between the two rolls.

In such a heat-fixing apparatus, it is particularly important to prevent offset and wrinkling of the image-bearing sheet in order to obtain a high-quality fixed image.

Conventionally used to prevent offset of the fixed image is a heating roll coated with resins having good release properties such a polytetrafluoroethylene [PTFE], perfluoroalkoxy-tetrafluoroethylene copolymers [PFA], etc. Such a heating roll, however, has insufficient fixing capability because of little resilience, and also is susceptible to surface damage. To eliminate these defects, a proposal was made to provide a heating roll coated with a layer of a mixture of a fluorine rubber and a fluorine resin, which is baked to have a fluorine resin layer as an outermost layer (U.S. Pat. No. 4,568,275). This heating roll, however, is poor in durability. Specifically speaking, because it has a fluorine resin surface layer of only several μm in thickness, the surface layer is worn out by producing only several tens of thousand copies due to contact with a cleaning member, etc.

Thus, a proposal was made to provide a heating roll having a fluorine resin layer over the above mixture layer (Japanese Patent Laid-Open No. 59-217010).

On the other hand, with respect to the prevention of wrinkling or creasing of paper sheets, various proposals were made. For instance, Japanese Utility Model Laid-Open No. 54-98226 discloses a heat-fixing apparatus comprising a heating roll and a pressure roll contacted with each other at low pressure, the pressure deformation ratio of both rolls being identical or nearly equal so that it can prevent meandering and creasing of even thick copy papers. And Japanese Patent Laid-Open No. 59-74578 discloses the use of a heating roll and a pressure roll, each of which is constituted by a core cylinder, a heat-resistant, resilient coating layer formed thereon, and a fluorine resin layer coated on the above layer to prevent creasing of copy papers even under severe conditions such as producing copies on both sides of thin paper sheets. Recently, investigations have been carried regarding the feasibility of printing addresses etc. directly on the envelopes using copier apparatus. The problem encountered in this printing process is that the envelopes bearing a toner image are susceptible to creasing when supplied to the above heat-fixing apparatus. Once creases appear on an envelope, it is not only bent or deformed, but also the printed address is destroyed or deformed by creases, rendering it unreadable in extreme cases. This is because a sheet member constituting an envelope is naturally overlapped, and its glued portion near the opening or its overlapped portion is constituted by nearly three or four plies of sheets, thereby increasing the maximum thickness of the envelope and causing the sliding of two overlapping sheets. This kind of problem has never been experienced by usual copiers. To cope with this problem, lower fixing pressure for fixing an image on an envelope than the fixing pressure for usual plain papers has been proposed (Japanese Patent Laid-Open No. 61-294475).

However, in the case of fixing a toner image on an envelope, the above-mentioned conventional techniques cannot provide satisfactory results, namely unable to prevent creasing of a paper sheet while retaining good fixability. Specifically speaking, according to Japanese Patent Laid-Open No. 61-294475, good fixation of a toner image cannot be achieved because of low fixing pressure, through creasing can be prevented. And Japanese Utility Model Laid-Open No. 54-98226 is unable to provide sufficient fixability because of the structure that both rolls are contacted with each other at small pressure to maintain equal or nearly equal the deformations of both rolls in contact portions. Further, the apparatus of Japanese Patent Laid-Open No. 59-74548 cannot be expected to prevent creasing under such severe conditions as fixing a toner image on an envelope, because the heating roll and the pressure roll have resilient layers of different thickness, and are unable to form a substantially flat nip portion therebetween.

OBJECT AND SUMMARY OF THE INVENTION

An object of the present invention is, therefore, to solve the problems peculiar to the above conventional techniques, thereby providing a heat-fixing apparatus capable of producing a high-quality fixed toner image without causing creases even on a sheet member constituted by a plurality of plies such as an envelope.

To achieve the above object, the heat-fixing apparatus according to the present invention comprises a heating roll to be brought into contact with a toner image formed on a sheet member, and a pressure roll arranged in contact with the heating roll to form a nip therebetween, each of the heating roll and the pressure roll having a heat-resistant, resilient layer formed on a cylindrical core and a resin layer having good release properties formed thereon, both of them having not only a surface hardness to make the nip portion substantially flat but also substantially the same outer diameter, and both rolls being in contact with each other at such pressure as to provide a nip width capable of providing good fixing capability. Further, both rolls are designed to have functions of separating the toner image-fixed sheet member from the heating roll.

By this structure, the nip portion between the heating roll and the pressure roll constituting the heat-fixing apparatus, through which the toner image-bearing sheet member passes, can be made substantially flat, thereby preventing the creasing of the toner image-bearing sheet member. Also, a substantially flat nip portion can prevent the sheet member after fixing from being wound around the heating roll, thereby making a separation blade unnecessary so that the roll surface is unlikely to be scratched by contact with a separation blade.

BRIEF DESCRIPTION OF THE DRAWINGS

FIG. 1 is a showing a pressure roll and a heat roll with each other at certain pressure for explaining the principle of the present invention;

FIG. 2 is a view of the heat-fixing apparatus according to one embodiment of the present invention;

FIG. 3 is a schematic view showing the heat roll and the pressure roll contacted with each other at pressure in the conventional heat-fixing apparatus;

DETAILED DESCRIPTION OF THE PREFERRED EMBODIMENTS

Figure 4:
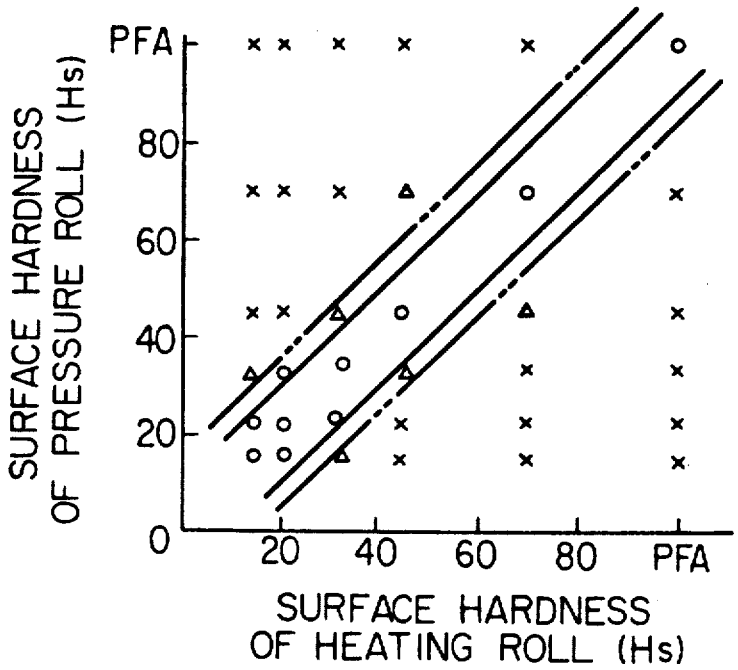
FIG. 4 is a graph showing the formation of creases on an envelope at surface hardness of the pressure roll and the heating roll of FIG. 1.

The present invention will be described in detail referring to the attached drawings.

First, the essential construction of the present invention will be described in comparison with the conventional one. FIG. 1 shows a pressure roll and a heating roll arranged in pressed contacted with each other according to the present invention and FIG. 3 shows the conventional one. In FIG. 1, 1 denotes a pressure roll and 2 a heating roll, both of which have substantially parallel axes and are rotatable in the directions shown by the arrow A, A', respectively. Both rolls 1, 2 are in contact with each other at a proper pressure. Like-wise, in FIG. 3 showing the conventional apparatus, a pressure roll 201 and a heating roll 202 are in contact with each other at a proper pressure and rotatable in the directions as shown by the arrows A, A', respectively. And in the conventional fixing apparatus, the pressure roll 201 is constituted by a cylindrical core 211 made of materials with good thermal conductivity such as aluminum alloys, iron, etc. and a heat-resistant, resilient coating layer 212 made of a silicone rubber having surface hardness Hs of 25°-55° or so formed on the cylindrical core 211, and the heating roll 202 is constituted by a cylindrical core 221 made of materials with good thermal conductivity and containing a heat source 223, the cylindrical core 221 being coated with a heat-resistant, release layer 224 made of low-surface energy resins such as tetrafluoroethylene resins (PTFE), perfluoroalkoxy resins (PFA), etc. Because of the difference between the two rolls in resiliency, the surface of the pressure roll 201 is resiliently deformed in the nip portion 203 in which the pressure roll 201 is in contact with the heating roll 202 as shown in FIG. 3. Thus, when a sheet such as a paper bearing a toner image (not shown) is supplied in the direction as shown by the arrow B, the sheet is first bent upward at the inlet 203a of the nip portion 203 and then bent downward in the middle of the nip portion 203, and further bent upward at the exit 203b of the nip portion 203. If the sheet has a portion consisting of two or more overlapping plies such as an envelope, the repeated bending thereof in the nip portion 203 causes some sliding between an upper ply and a lower ply. In addition, because of this bending action, if there is difference in paper thickness in the envelope, it acts to generate the difference in moving speed between a thick portion and a thin portion. This also contributes to the difference in moving speed between the upper ply and the lower ply of the envelope.

On the other hand, in the fixing apparatus of the present invention, each of the pressure roll 1 and the heating roll 2 is constituted by a cylindrical core 11, 21 coated with a heat-resistant, resilient layer 12, 22 having substantially the same material and the same thickness with surface hardness difference (ΔHs) of 15° or less therebetween. Therefore, the nip portion 3 is almost flat as shown in FIG. 1, exerting no bending action to the toner image-bearing sheet member passing therethrough and also maintains the moving speed of upper and lower plies of the sheet member almost equal.

To confirm the above functions, the following experiments were conducted.

In FIG. 1, each of the pressure roll 1 and the heating roll 2 was constituted by coating a cylindrical core 11, 21 made of an aluminum alloy with an HTV silicone rubber or a perfluoroalkoxy resin (PFA) to have an outer diameter of 31 mm, and they were brought into pressed contact with each other at linear pressure of 1.2 kg/cm to conduct fixing operation. The fixing speed was 166 mm/sec. and the fixing temperature was 180° C. In this case, the silicone rubbers of various hardness were used together with the roll coated with the PFA resin. Using an envelope as a toner image-bearing sheet member, 100 envelopes were tested with respect to creasing for each combination of the silicone rubber and the PFA resin. The test results are shown in FIG. 4, in which PFA in both the abscissa and the ordinate shows the surface hardness of PFA which is actually over 100, exceeding the capacity of the hardness tester used. In this case, the surface hardness (A-type spring hardness: JIS K 6301) of the rolls was measured by a commercial hardness tester (manufactured by Kobunshi Keiki K.K., Type JA). In FIG. 4, O shows "no creasing," Δ"partially creasing," and ×"overall creasing." As is clear from FIG. 4, when there is no difference in surface hardness between the pressure roll and the heating roll, no crease is formed on the envelope. On the other hand, when both rolls have large surface hardness difference, almost all envelopes are deformed be creasing. When the above surface hardness difference (ΔHs) is 15° or less (within the range defined by the parallel chain lines), and more preferably 10° C. or less (within the range defined by the parallel solid lines), the deformation of the nip portion 3 as shown in FIG. 3 can be avoided. In this case, when the surface hardness Hs of the pressure roll and/or the heating roll exceeds 85°, no creasing of the paper sheet appears but fixing capability is insufficient because of the lack in a nip width (W in FIG. 1). In this condition, when the fixing pressure increases to provide a sufficient nip width, the rubber layer is subjected to large plastic deformation due to heat and pressure, resulting in the decrease in service life of both rolls.

Figure 5:
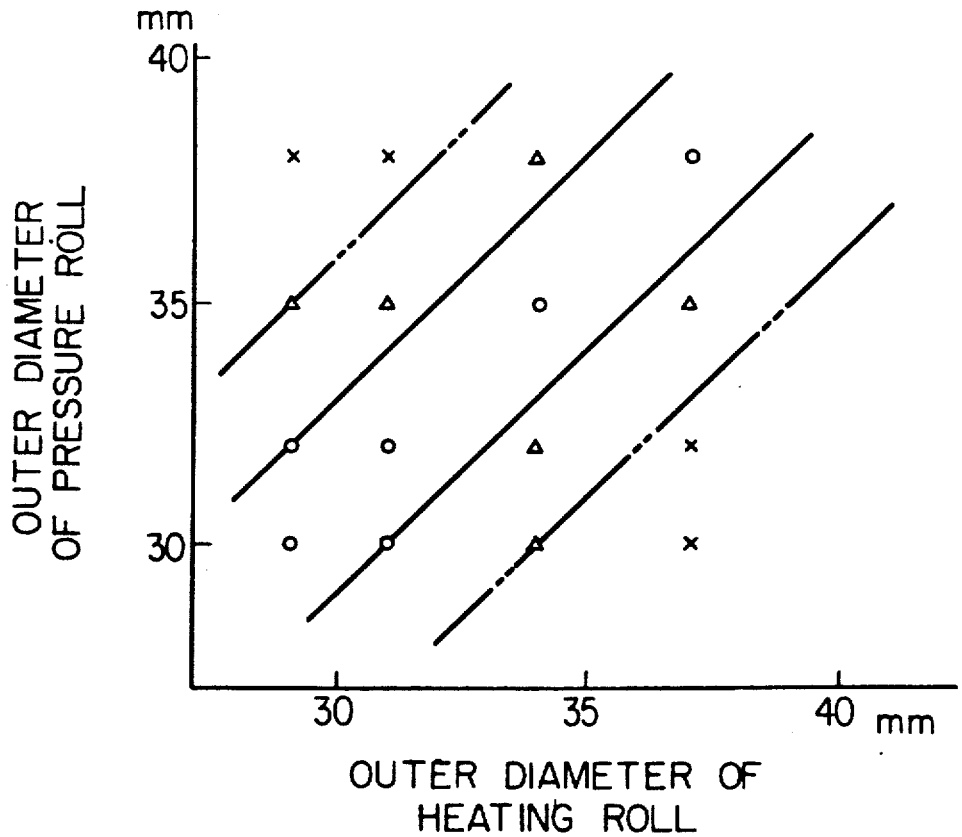
FIG. 5 is a graph showing the formation of creases on an envelope at various diameters of the pressure roll and the heating roll of FIG. 1.

FIG. 5 shows the formation of creases on a toner image-bearing sheet member for various diameters of the pressure roll and the heating roll under the same fixing conditions as in FIG. 4. In FIG. 5, O shows "no creasing," Δ"partially creasing," and ×"overall creasing." As is clear from FIG. 5, when there is no difference in diameter between the pressure roll and the heating roll, no crease appears on the envelope as a toner image-bearing sheet member. On the other hand, when both rolls have large diameter difference, almost all envelopes are deformed by creases. Specifically speaking, when the diameter difference is 5 mm or less (within the range defined by the parallel chain lines), and more preferably 2 mm or less (within the range defined by the parallel solid lines), the creasing of envelope can be substantially avoided. Particularly extremely good results are obtained when both rolls have substantially the same outer diameter.

As described above, by providing the heating roll and pressure roll with such surface hardness as to provide an almost flat nip portion therebetween, and by designing both rolls to have as close diameter as possible, the creasing can be avoided even on an envelope.

Nevertheless, if the structure shown in FIG. 1 is applied to an actual machine as it is, problems might take place in some cases with respect to offset. FIG. 2 shows a structure for solving this problem.

In FIG. 2, the pressure roll 101 further has a release layer 114 made of the above-mentioned fluorine resin, etc. formed on the surface of a heat-resistant, resilient layer 112 formed on a cylindrical core 111, and the heating roll 102 has a release layer 124 formed on the surface of a heat-resistant, resilient layer 122 formed on the surface of a cylindrical core 121. Since the heating roll 102 has a release resin surface layer, offset can be prevented. And the pressure roll 101 also has a release resin outer layer. Thus, both rolls have substantially the same surface hardness, making it possible to prevent creasing too. In both rolls, the release resin layer may have a thickness of 10–50 μm or so.

To carry out good fixing by the apparatus of FIG. 2, the following conditions are desirably met.

In the conventional apparatus shown in FIG. 3, since the pressure roll is of a structure resiliently deformable with ease, a nip width of usually 3–5 mm for providing good fixing capability can be provided even at linear pressure of up to 1 kg/cm or so between both rolls. It should be noted, however, that the linear pressure of 0.1–0.2 kg/cm is likely to cause creasing on an envelope with this apparatus.

On the other hand, in the apparatus of FIG. 2, since the pressure roll has larger rigidity than the conventional one, both rolls should be in contact with each other at higher contact pressure which enables it to ensure the desired nip width. Specifically, the contact pressure of the two rolls is desirably 0.8 kg/cm or more in linear pressure, and more preferably 1.2 kg/cm or more. However, when the linear pressure becomes too large, a service life of this apparatus is shortened because of plastic deformation of the rubber layer, and so it is preferably 2.0 kg/cm or less. Particularly to ensure good fixing at a fixing speed of 100 cm/sec. or more, the linear pressure should be 1.2 kg/cm or more.

To achieve the object of the present invention, the following conditions with respect to the rolls are also needed.

If the pressure roll and the heating roll have surface hardness Hs exceeding 85°, the desired nip width cannot be provided at a proper contact pressure between the two rolls. In this case, when the contact pressure of the two rolls is increased to get the desired nip width, the toner image-bearing sheet member is deformed, producing undesirable phenomena such as a shortened service life, creasing, etc. The preferred surface hardness is 80° or less.

Next, when the heating roll has a heat-resistant, resilient layer having a thickness less than 1 mm, the layer shows little effect as a resilient layer, making it difficult to maintain the desired hardness and uniformness of the roll surface. On the other hand, when the thickness exceeds 2 mm, the heating roll not only has an uneven temperature distribution, but also the conduction of heat is hindered, resulting in overheating of both ends of the heat roll on which the paper never passes, causing unpredictable accidents.

And when a material constituting the resilient layer formed in the heating roll has a thermal conductivity of less than $0.2\times10^{-3}$ cal/cm.sec.°C., conduction of heat is insufficient in the heating roll, making the temperature distribution uneven on the heating roll and also causing partial heating. The preferred thermal conductivity of the resilient layer is $0.6\times10^{-3}$ cal/cm sec.°C. or more. Incidentally, to increase the thermal conductivity of the resilient layer more than $1.5\times10^{-3}$ cal/cm.sec.°C., it should contain a large amount of thermally conductive materials such as carbon black, metal oxides such as titanium oxide, etc. The inclusion of such thermally conductive materials, however, results in the surface hardness Hs exceeding 80°, making it difficult to ensure a sufficient nip width. Therefore, the thermal conductivity of the resilient layer is preferably $1.5\times10^{-3}$ cal/cm sec.°C., or less.

In addition to the above-mentioned points, the apparatus of the present invention differs from the conventional one in the following points.

In the conventional heating roll-type fixing apparatus, since the nip portion is in the shape as shown in FIG. 3, the toner image-bearing sheet member tends to be wound around the heating roll after passing the nip portion. What is done conventionally to solve this problem is to provide a separation blade which is kept in contact with the heating roll to separate the image-fixed paper from the heating roll. However, the use of the separation blade damages the surface of the heating roll, resulting in a shortened service life of the roll, and also because the separation blade itself is deformed or deteriorated by heat during a long period of use, it should be replaced to recover a separation function.

On the other hand, in the apparatus of the present invention, the nip portion is in substantially a flat shape as shown in FIG. 2, whereby the toner image-bearing sheet member after passing through the nip portion can be withdrawn from the fixing apparatus without being wound around the heating roll. That is, the apparatus of the present invention is inherently provided with a function of separating the image-bearing sheet member which has passed through the nip portion from the heating roll without using a separation blade.

The present invention has been explained by the above embodiments, but it should be noted that the following modifications are possible.

First, the resilient layers of the heating roll and of the pressure roll are not limited to a silicone rubber, and they may be made of known other materials such as a fluorine rubber or a mixture of a fluorine rubber and a fluorine resin. Also, the resilient layer may be constituted by two layers: for instance, a silicone rubber lower layer and a fluorine rubber upper layer which may contain fluorine resin. Such structure is advantageous in terms of roll strength. Specifically speaking, by forming a silicone rubber layer on the surface of the cylindrical core, forming a layer of a fluorine rubber containing a fluorine resin thereon, baking them and then forming a fluorine resin surface layer thereon, the fluorine resin surface layer is made highly resistant to peeling off because the fluorine resin layer exist on the surface of the fluorine rubber layer.

Because of the above-described structure and function of the apparatus according to the present invention, even a toner image-bearing sheet member constituted by a plurality of plies such as an envelope can be subjected to toner image fixing operation without causing the creasing of the sheet member, thus providing a high-quality toner image fixed thereon. And more particularly by constructing the heating roll and the pressure roll by forming a heat-resistant, resilient layer and a heat-resistant, release layer or a release resin layer on each cylindrical core, the fixing of a high-quality toner image on such sheet member as an envelope can be performed without creases even for the envelope. And without requiring a separation blade, the sheet member can be prevented from being wound around the heating roll.

What is claimed is:

1. A heat-fixing apparatus comprising a heating roll and a pressure roll, each of said heating roll and said pressure roll being constituted by a cylindrical core coated with a heat-resistant, resilient layer having a thickness of 1-2 mm and a thermal conductivity of $0.2\times10^{-3}$ cal/cm.sec.°C. or more, and a resin surface layer having release properties, the difference in outer diameter between said heating roll and said pressure roll being 5 mm or less, and said heating roll and said pressure roll having a surface hardness Hs of 85° or less and being in pressed contact with each other at a linear pressure of 0.8-2.0 kg/cm to provide therebetween a flap nip portion through which a toner image-bearing multilayer sheet member passes without creasing.

2. The heat-fixing apparatus according to claim 1, wherein said heating roll and said pressure roll have substantially the same outer diameter.

3. The heat fixing apparatus according to claim 1, wherein the difference in surface hardness ΔHs between said heating roll and said pressure roll is 15° is less.

*4. A heat-fixing apparatus comprising a heating roll and a pressure roll, each of said heating roll and said pressure roll being constituted by a cylindrical core coated with a heat-resistant, resilient layer having a thickness of 1-2 mm and a thermal conductivity of $0.2\times10^{-3}$ cal/cm.sec. °C. or more, and a resin surface layer having release properties, the difference in outer diameter between said heating roll and said pressure roll being 5 mm or less, and said heating roll and said pressure roll having a surface hardness Hs of 85° or less and being in pressed contact with each other at a linear pressure of 0.8-2.0 kg/cm to provide therebetween a flat nip portion.*

*5. The heat-fixing apparatus according to claim 4, wherein said heating roll and said pressure roll have substantially the same outer diameter.*

*6. The heat fixing apparatus according to claim 4, wherein the difference in surface hardness ΔHs between said heating roll and said pressure roll is 15° or less.*

* * * * *